United States Patent
Roslund et al.

(10) Patent No.: US 12,107,380 B1
(45) Date of Patent: Oct. 1, 2024

(54) CONTROLLING SOLITON SELF-FREQUENCY SHIFT

(71) Applicant: Vector Atomic, Inc., Pleasanton, CA (US)

(72) Inventors: Jonathan David Roslund, Pleasanton, CA (US); Arman Cingoz, Pleasanton, CA (US); Abijith Sudarsan Kowligy, Livermore, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

(21) Appl. No.: 18/480,119

(22) Filed: Oct. 3, 2023

(51) Int. Cl.
| | | |
|---|---|---|
| *H01S 3/10* | (2006.01) | |
| *H01S 3/067* | (2006.01) | |
| *H01S 3/08* | (2023.01) | |
| *H01S 3/1106* | (2023.01) | |

(52) U.S. Cl.
CPC ...... *H01S 3/10061* (2013.01); *H01S 3/06791* (2013.01); *H01S 3/08054* (2013.01); *H01S 3/1106* (2013.01)

(58) Field of Classification Search
CPC .......... H01S 3/06791; H01S 3/08054; H01S 3/1308; H01S 3/10061
See application file for complete search history.

(56) References Cited

U.S. PATENT DOCUMENTS

| | | | | |
|---|---|---|---|---|
| 5,440,573 A | * | 8/1995 | Fermann | H01S 3/067 372/18 |
| 5,574,739 A | * | 11/1996 | Carruthers | H01S 3/06791 372/18 |
| 5,880,877 A | * | 3/1999 | Fermann | H01S 3/302 372/6 |

(Continued)

FOREIGN PATENT DOCUMENTS

| | | | | |
|---|---|---|---|---|
| CA | 2294897 C | * | 4/2009 | ............ H01S 3/1112 |
| CN | 102273027 A | * | 12/2011 | ............. H01S 3/067 |

(Continued)

OTHER PUBLICATIONS

Alam et al., "Tunable Picosecond Frequency-Shifted Feedback Fiber Laser at 1550 nm", Sep. 2004, Photonics Technology Letters, vol. 16, No. 9, 2012-2014. (Year: 2004).*

(Continued)

*Primary Examiner* — Joshua King
(74) *Attorney, Agent, or Firm* — Patterson + Sheridan, LLP

(57) ABSTRACT

Embodiments herein describe using a birefringent element (e.g., a half-wave plate, full-wave plate, birefringent crystal, or metasurface) or a band-pass filter to reduce the laser line broadening induced by the soliton self-frequency shift. The birefringent element may a free space element that is part of the laser cavity. Due to dispersion, different frequencies (or colors) of light in the laser travel through the birefringent element at different speeds. This dispersion results in the birefringent element introducing slightly different polarization shifts for the different frequencies of light in the laser. When this light passes through a polarizer (which is set to filter out polarizations different from a desired polarization), the polarizer attenuates or extinguishes the frequencies that do not have the polarization of the design frequency of the birefringent element.

18 Claims, 12 Drawing Sheets

(56) References Cited

U.S. PATENT DOCUMENTS

| | | | | |
|---|---|---|---|---|
| 7,936,508 | B2* | 5/2011 | Oto | G02B 5/3083 |
| | | | | 359/489.07 |
| 8,059,966 | B2* | 11/2011 | Igarashi | H04B 10/299 |
| | | | | 398/179 |
| 2002/0018630 | A1* | 2/2002 | Richardson | G02B 6/03666 |
| | | | | 359/341.1 |
| 2004/0213302 | A1* | 10/2004 | Fermann | H01S 3/0014 |
| | | | | 372/6 |
| 2007/0071060 | A1* | 3/2007 | Holzwarth | G01J 11/00 |
| | | | | 372/98 |
| 2007/0216993 | A1* | 9/2007 | Aiso | H01S 3/06791 |
| | | | | 359/340 |
| 2013/0064256 | A1* | 3/2013 | Xu | H01S 3/10053 |
| | | | | 372/27 |
| 2013/0230071 | A1* | 9/2013 | Haensel | H01S 3/08 |
| | | | | 372/99 |
| 2014/0321483 | A1* | 10/2014 | Fermann | H01S 3/105 |
| | | | | 372/18 |
| 2016/0181759 | A1* | 6/2016 | Holzwarth | H01S 3/137 |
| | | | | 372/98 |
| 2017/0093117 | A1* | 3/2017 | Haensel | H01S 3/1307 |
| 2017/0264070 | A1* | 9/2017 | Cingoz | H01S 3/1106 |
| 2019/0181606 | A1* | 6/2019 | Peng | H01S 3/0672 |

FOREIGN PATENT DOCUMENTS

| | | | | |
|---|---|---|---|---|
| CN | 105896248 | A * | 8/2016 | H01S 3/06725 |
| CN | 107706704 | A * | 2/2018 | H01S 3/067 |
| CN | 108832471 | A * | 11/2018 | H01S 3/06712 |
| CN | 108879300 | A * | 11/2018 | |
| CN | 108899754 | A * | 11/2018 | |
| CN | 112542761 | A * | 3/2021 | |
| CN | 113346341 | A * | 9/2021 | H01S 3/06716 |
| CN | 113690725 | A * | 11/2021 | |
| CN | 115347441 | A * | 11/2022 | |
| JP | 2005268819 | A * | 9/2005 | H01S 3/0675 |
| JP | 4141664 | B2 * | 8/2008 | H01S 3/083 |
| WO | WO-03104886 | A1 * | 12/2003 | H04B 10/25077 |
| WO | WO-2013120113 | A1 * | 8/2013 | H01S 3/06725 |
| WO | WO-2017210665 | A1 * | 12/2017 | H01S 3/06712 |
| WO | WO-2021155273 | A1 * | 8/2021 | H01S 3/06716 |

OTHER PUBLICATIONS

Laszczych et al. "Mode-Locking Dynamics in an All-PM Figure-Nine Tm-Doped Fiber Laser", Oct. 20, 2022, Appl. Sci. 12, 10613, 1-12 (Year: 2022).*

Hou et al., "Observation of Bound Solitons Generated by a Figure-9 Fiber Laser in the 1 um Band", Jul. 10, 2023, Applied Optics, vol. 62, No. 20, 5580-5587. (Year: 2023).*

Zhang et al., "Observations of Wavelength Tuning in a Mode-Locked Figure-9 Fiber Laser", Feb. 8, 2023, Photonics, 10, 184, 1-11. (Year: 2023).*

Romagnoli et al., "Tunable Erbium-Ytterbium Fiber Sliding-Frequency Soliton Laser", Jan. 1995, J. Opt. Soc. Am. B, vol. 12, No. 1, 72-76. (Year: 1995).*

Yun et al., "Wavelength-Swept Fiber Laser with Frequency Shifted Feedback and Resonantly Swept Intra-Cavity Acoustooptic Tunable Filter" Aug. 1997, Quantum Electronics, vol. 3, No. 4 1087-1096 (Year: 1997).*

Newbury, N. R., & Washburn, B. R. (2005). Theory of the frequency comb output from a femtosecond fiber laser. IEEE Journal of Quantum Electronics, 41(11), 1388-1402.

Washburn, B. R., Swann, W. C., & Newbury, N. R. (2005). Response dynamics of the frequency comb output from a femtosecond fiber laser. Optics express, 13(26), 10622-10633.

Dr. Rudiger Paschotta, "Birefringent Tuners," RP Photonics Encyclopedia, Date Accessed: Sep. 13, 2023, pp. 1-9.

* cited by examiner

CONTROLLING SOLITON SELF-FREQUENCY SHIFT

BACKGROUND

Field

Embodiments of the present invention generally relate to line narrowing a laser signal.

Description of the Related Art

Optical atomic clocks offer improved frequency instabilities compared to microwave frequency standards due to the higher quality factor Q associated with an optical resonance. Many atomic clocks use a frequency comb to convert the high precision optical signal into a correspondingly precise electrical signal at microwave frequencies. To stabilize one of the two degrees of freedom for the frequency comb, a single comb tooth is often locked to a high precision clock reference laser.

The other degree of freedom for the frequency comb that is often stabilized is the carrier envelope offset (CEO) frequency ($f_{CEO}$), which is the frequency offset between the lowest virtual tooth of the frequency comb and zero. A $f_{CEO}$ beatnote can be generated by beating a given comb tooth against another frequency-doubled tooth, which requires at least one octave of bandwidth. The signal-to-noise (SNR) of the resultant signal is limited by the phase noise on the $f_{CEO}$ beatnote. The dominant source of this phase noise originates from relative intensity noise (RIN) on the pump laser. This pump RIN couples to the center wavelength of the frequency comb envelope by the soliton induced self-frequency shift (henceforth called soliton self-frequency shift), and the center wavelength of the frequency comb couples in turn to the round trip time by the cavity dispersion (Gordon-Haus jitter). This dual coupling directly translates laser pump RIN to phase noise of the comb teeth. The reduced SNR of the $f_{CEO}$ beatnote limits the bandwidth of noise suppression by a servo and increases the propensity for the beatnote to cycle-slip over long time intervals. Reduction of the soliton self-frequency shift decreases RIN-induced CEO phase noise, which permits tighter phase locks with less residual error.

SUMMARY

One embodiment described herein is a laser cavity that includes an input port configured to receive a pump signal to generate a laser signal, an output port configured to transmit the laser signal, a birefringent element configured to receive the laser signal, and a polarizer configured to filter the laser signal after the laser signal has passed through the birefringent element. Moreover, the birefringent element and the polarizer are configured to control a soliton self-frequency shift corresponding to the laser signal.

Another embodiment described herein is a method that includes generating a laser signal at a laser cavity, transmitting the laser signal through a birefringent element in the laser cavity, filtering the laser signal using a polarizer, after the laser signal has passed through the birefringent element where filtering the laser signal controls a soliton self-frequency shift corresponding to the laser signal, and outputting the filtered laser signal.

Another embodiment described herein is a laser cavity that includes an input port configured to generate a laser signal from a pump laser, an output port configured to transmit the laser signal, and a band-pass filter configured to filter the laser signal to control the soliton self-frequency shift of the laser signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
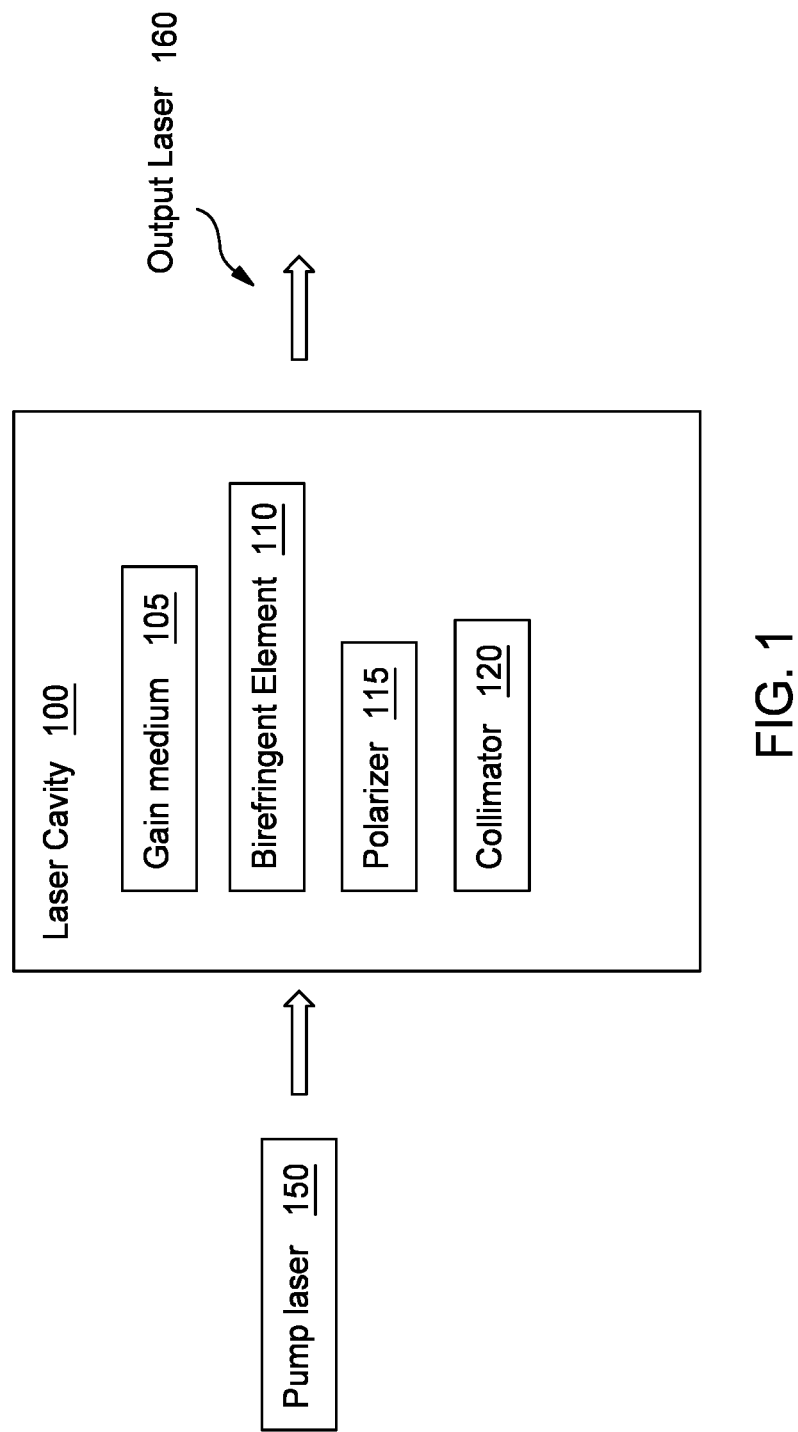
FIG. 1 illustrates a laser system, according to one embodiment.

Embodiments herein describe using a birefringent element (e.g., a half-wave plate, full-wave plate, or birefringent crystal) to reduce a frequency comb linewidth broadened by pump laser RIN. In one embodiment, the birefringent element is used to decrease the RIN-induced CEO phase noise for a $f_{CEO}$ beatnote of a frequency comb, although the embodiments herein are not limited to this use case. The birefringent element may be a free space element that is part of the laser cavity. Due to both material dispersion and the fixed length of the element, different frequencies (or colors) of light in the laser experience different polarization rotations after passing through the birefringent element. When the light exiting the birefringent element passes through a polarizer (which is set to filter out polarizations different from a desired polarization), the polarizer attenuates or extinguishes the frequencies that are different from the design wavelength of the birefringent element. The design wavelength of this birefringent may be chosen to be a shorter wavelength than the center frequency of the frequency comb in its absence, which creates a cavity-pulling effect to shorter wavelengths. As a result, the pump-induced soliton self-frequency shift to longer wavelengths is balanced by the cavity-pulling to shorter wavelengths. This interplay reduces the soliton self-frequency shift and thereby decreases RIN-induced phase noise. This results in a narrowing of the frequency comb linewidths, which increases the SNR of a beatnote, such as that from the $f_{CEO}$.

In one embodiment, the birefringent element is a free space element that is rotatably mounted (e.g., mounted in a rotatable cylinder) in the laser cavity. Rotating the birefringent element can change the amount of polarization dispersion the birefringent element introduces on the different frequencies (or colors) of light that are not at the design wavelength of the element, and thus, the amount these frequencies are attenuated by the polarizer. For example, the birefringent element may be adjusted to have a maximum reduction of these frequencies (e.g., 45 degrees) or may be rotated to some angle less than 45 degrees in order to provide the ability to later tune the laser wavelength. However, in another embodiment, the birefringent element is set to a particular setting and is not rotatable—i.e., not changeable.

In one embodiment, instead of using a birefringent element to compensate for the soliton self-frequency shift, a broad band-pass filter can be added to the laser cavity. The band-pass filter can also attenuate the frequencies in a pulsed laser that are not at the desired center frequency, like the birefringent element, which reduces the soliton self-frequency shift and decreases RIN-induced phase noise. However, a band-pass filter also induces extra loss and attenuates the desired peak wavelength while a birefringent element does not. Also, a band-pass filter may not be adjustable like a birefringent element to tune or control the reduction in the soliton self-frequency shift.

Regardless of whether a birefringent element or a band-pass filter is used, the embodiments herein have several advantages, such as (i) being compact (where one micro-optic wave plate inserted into free-space section of the cavity allows in-situ continuous tuning of spectral shifts, (ii) the birefringent element or band-pass filter may be inserted after construction of the cavity (iii) the birefringent element can be optimally tuned to account for build-to-build variations of a mode-locked oscillator, (iv) does not require dispersion tuning of the cavity, which typically uses expensive dispersion compensating optical fibers and becomes difficult for high repetition rate fiber cavities, and (v) avoids stretched pulse or dispersion managed pulse dynamics, which are extremely sensitive to variations in intra-cavity elements.

FIG. 1 illustrates a laser system, according to one embodiment. The system includes a laser cavity 100 which receives an optical signal from a pump laser 150. The pump laser 150 can be a fiber laser or a free space laser. In one embodiment, the laser cavity 100 is a mode locked laser where the soliton self-frequency shift is controlled. In one embodiment, the laser signal generated in the laser cavity 100 is a polarization maintaining (PM) mode locked laser at least when it passes through the birefringent element 110.

The laser cavity 100 includes a gain medium 105, a birefringent element 110, a polarizer 115, and a collimator 120. In general, the gain medium 105 (e.g., a gain fiber) amplifies the optical signal provided by the pump laser 150. For instance, the gain medium 105 may have a non-linear gain curve where different frequencies (or colors) in the laser signal have different gains.

Figure 4:
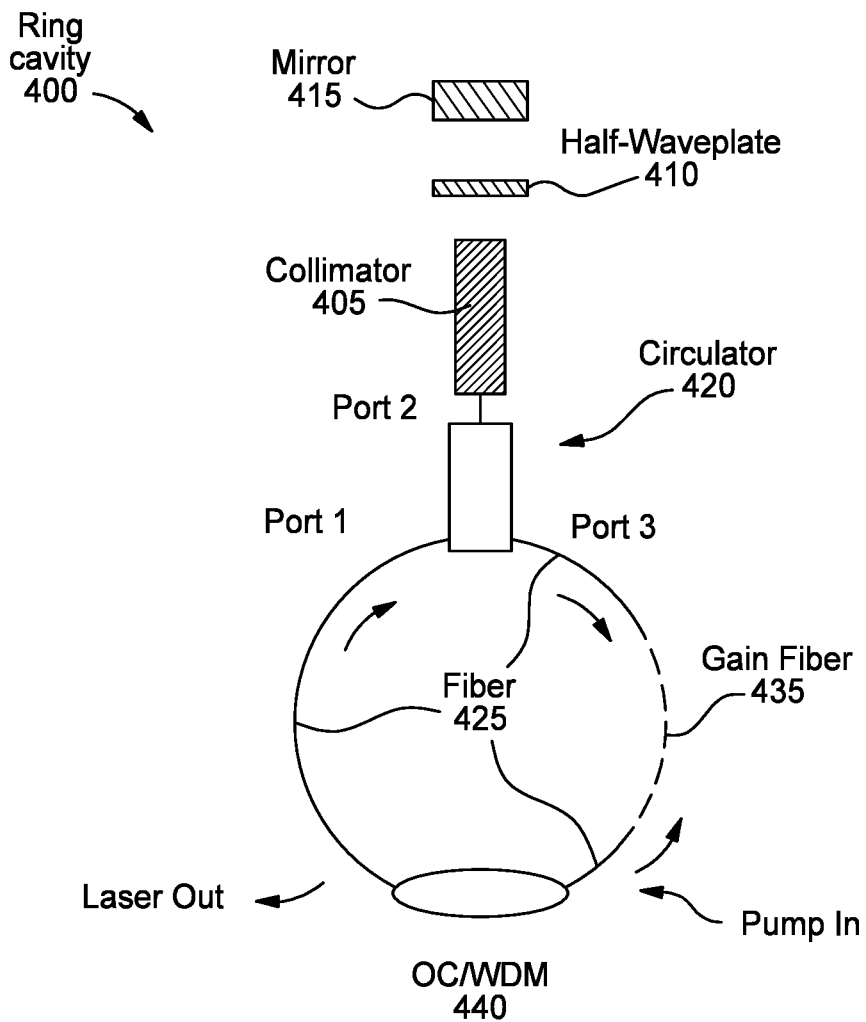
FIG. 4 illustrates a ring cavity with a half-wave plate, according to one embodiment.
Figure 5:
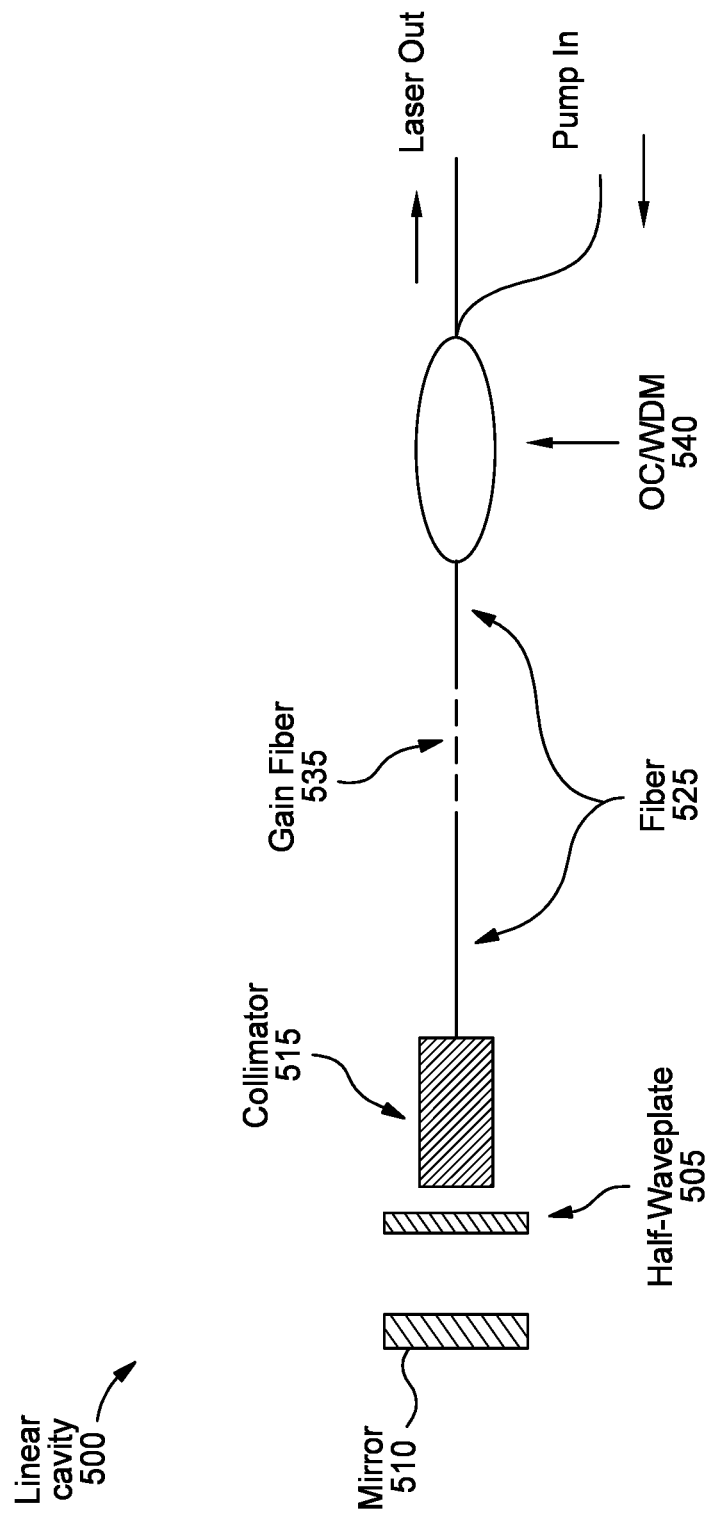
FIG. 5 illustrates a linear cavity with a half-wave plate, according to one embodiment.
Figure 9A:
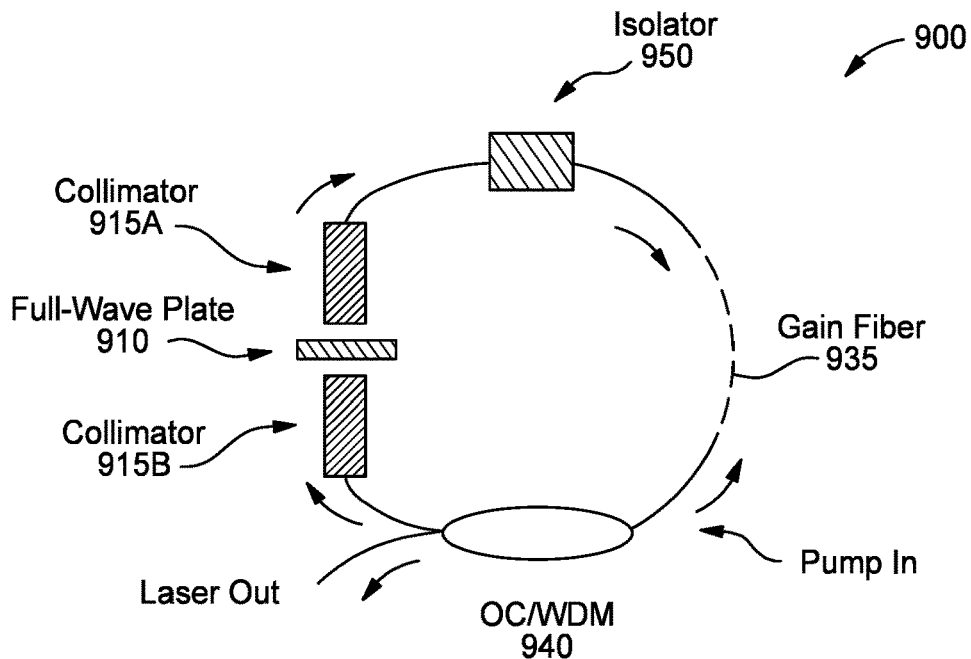
FIGS. 9A and 9B illustrate ring cavities with a full-wave plate, according to one embodiment.
Figure 9B:
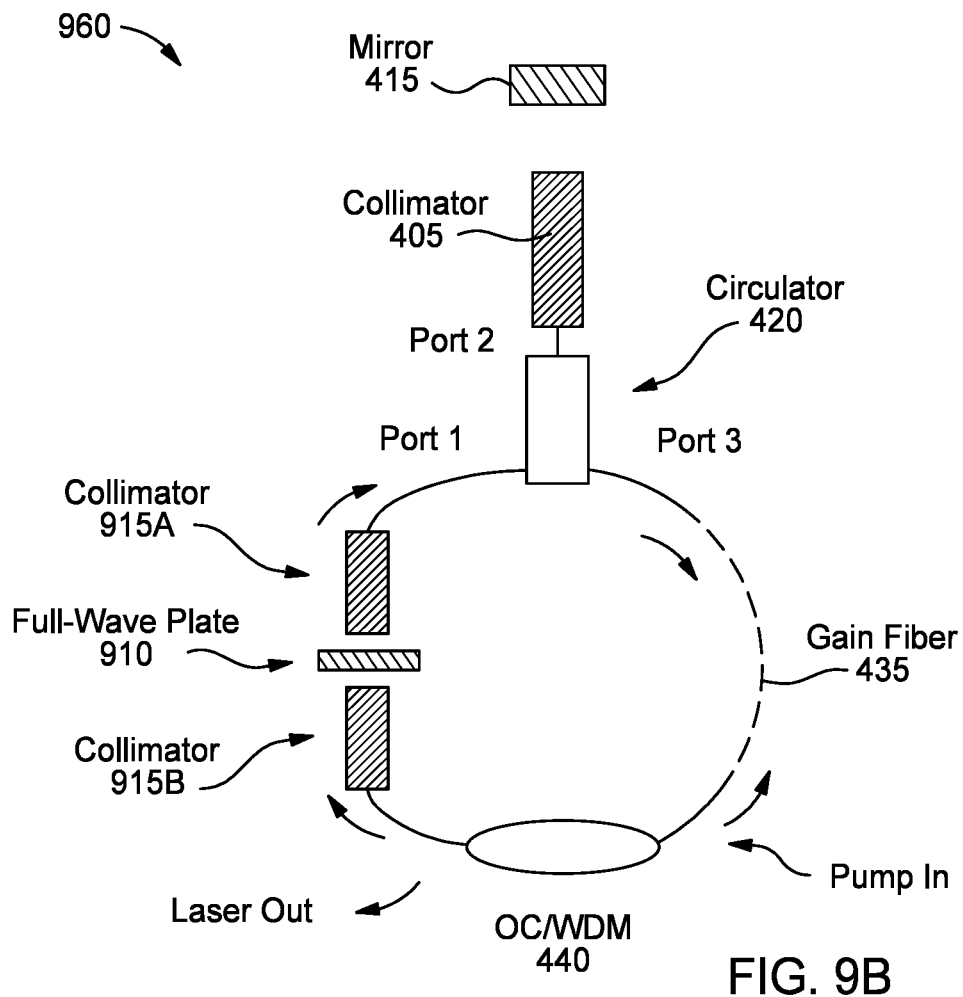

In this example, the birefringent element 110 is a free space optic, in which case the collimator 120 is used to collimate the laser signal before it passes through the birefringent element 110. In one embodiment, the birefringent element 110 (e.g., a half-wave plate as shown in FIGS. 4 and 5, a full-wave plate as shown in FIGS. 9A and 9B, or a birefringent crystal) rotates the polarization of the laser signal depending upon its wavelength. As will be discussed in more detail below, the birefringent element 110 may provide a full rotation of the light at the design wavelength for the element. However, due to dispersion, light at frequencies not at the design wavelength receive a slightly different rotation. Thus, when passing through a polarizer 115, the light at the design wavelength passes through unaffected (assuming the polarizer 115 is designed to permit light with the same polarization as the design wavelength to pass through), but the light at the other wavelengths is attenuated or extinguished by the rotator. This wavelength dependent cavity loss element helps to compensate for the soliton self-frequency shift and thereby narrow the linewidth of the laser signal. In another embodiment, instead of using the birefringent element 110, a band-pass filter can be used which is discussed in FIG. 12. The laser cavity 100 then generates an output laser 160.

The phase noise for a comb tooth is typically determined by the pump laser RIN (e.g., the pump laser 150) where the connection between these two quantities is given by the multiplicative product of the net cavity dispersion and the soliton self-frequency shift. The standard way to narrow the CEO beatnote is to decrease the net cavity dispersion through the use of dispersion-compensating elements, such as an optical fiber. This approach is expensive and time consuming, and resultant mode-locked dynamics are very sensitive to where the dispersion-compensating elements are placed in the cavity. That is, there is a positional distribution that needs to be achieved which makes it difficult to place the dispersion-compensating fibers so they function correctly. Moreover, the use of dispersion compensating fibers may require the use of fiber portions of non-negligible length (e.g., 1 meter), which limits the repetition frequency of the laser system. Instead, the birefringent elements 110 can be small or short which makes them much easier to add to the cavity and do not significantly change the overall cavity length. Also, the birefringent elements 110 do not have to be placed at specific locations in the cavity 100.

Figure 2:
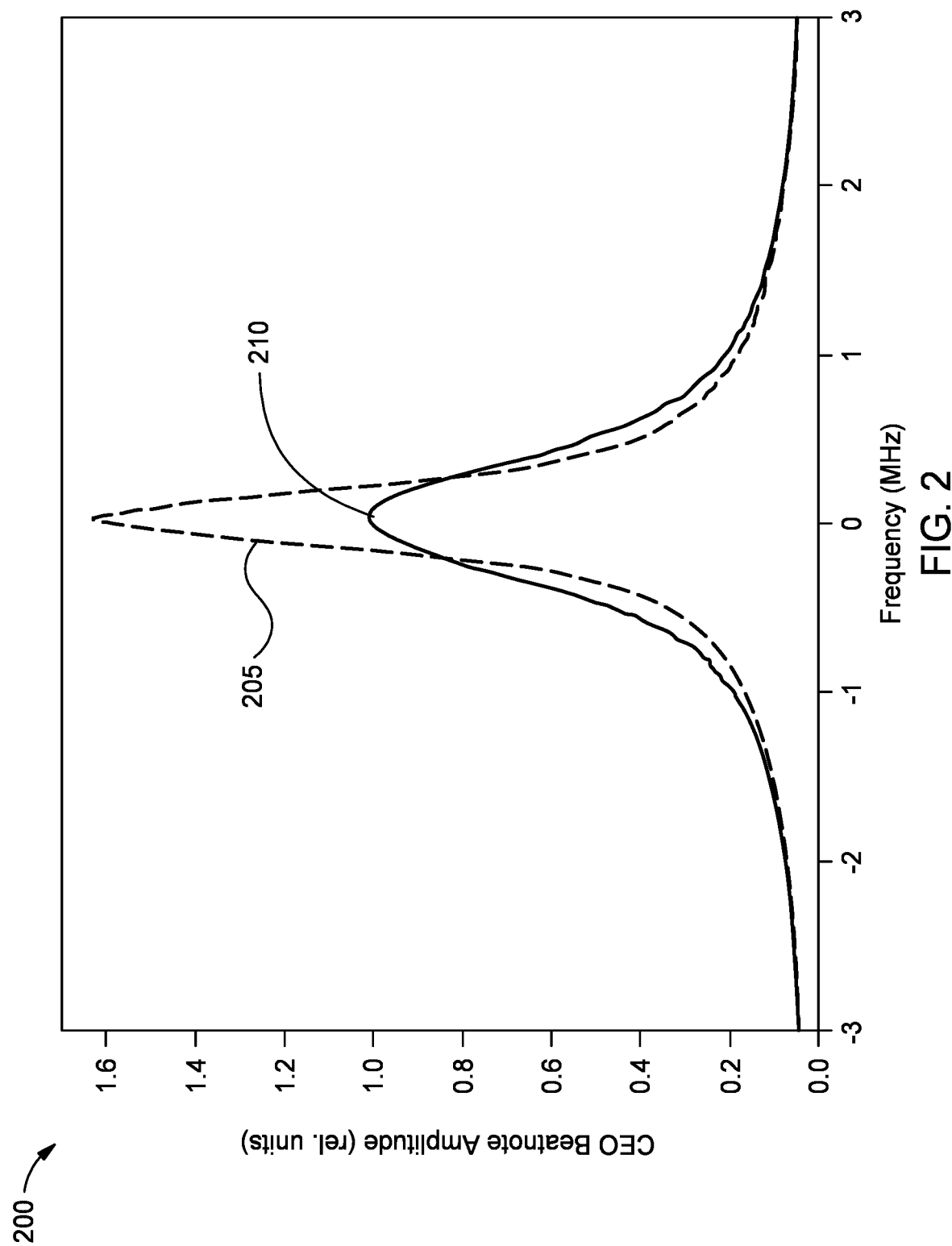
FIG. 2 illustrates using a birefringent element to narrow the linewidth of the $f_{CEO}$ beatnote, according to one embodiment.

FIG. 2 illustrates using a birefringent element (e.g., the birefringent element 110 in FIG. 1) to narrow a CEO beatnote linewidth, according to one embodiment. The chart 200 includes a plot 205 illustrating the amplitude of a CEO beatnote without using the birefringent element while the plot 210 illustrates the amplitude of a CEO beatnote with using the birefringent element.

Frequency combs are robust tools for optical atomic clocks, time-transfer, and spectroscopy. Stabilization of the comb often involves locking the CEO offset frequency to a radio frequency (RF) reference. A noisy CEO offset frequency makes it difficult to phase lock the beatnote tightly and contributes to high residual phase noise. This high residual phase noise translates into timing jitter and reduced resolution for spectroscopy. As shown, the birefringent element reduces the linewidth of the beatnote. That is, the birefringent element counter-balances the soliton self-frequency shift, which serves to decrease the RIN-induced CEO phase noise. As a result, this makes it possible to achieve tighter phase locks of the CEO beatnote with less residual error.

Mitigating the self-frequency shift through tuning of the net cavity dispersion is time-consuming, requires expensive dispersion-compensating fibers, and becomes difficult for high repetition-rate (short cavity) systems. Moreover, intra-cavity pulse dynamics are very sensitive to overall cavity dispersion and complicates mode-locking.

In contrast, the birefringent element allows continuous tuning of the CEO linewidth; constructing cavities with 'standard', anomalous dispersion fibers; is readily implemented for high-repetition rate systems, and avoids dispersion-managed pulse dynamics. Moreover, the birefringent element allows direct tuning of the center wavelength in order to minimize build-to-build variations of the laser system.

Figure 3A:
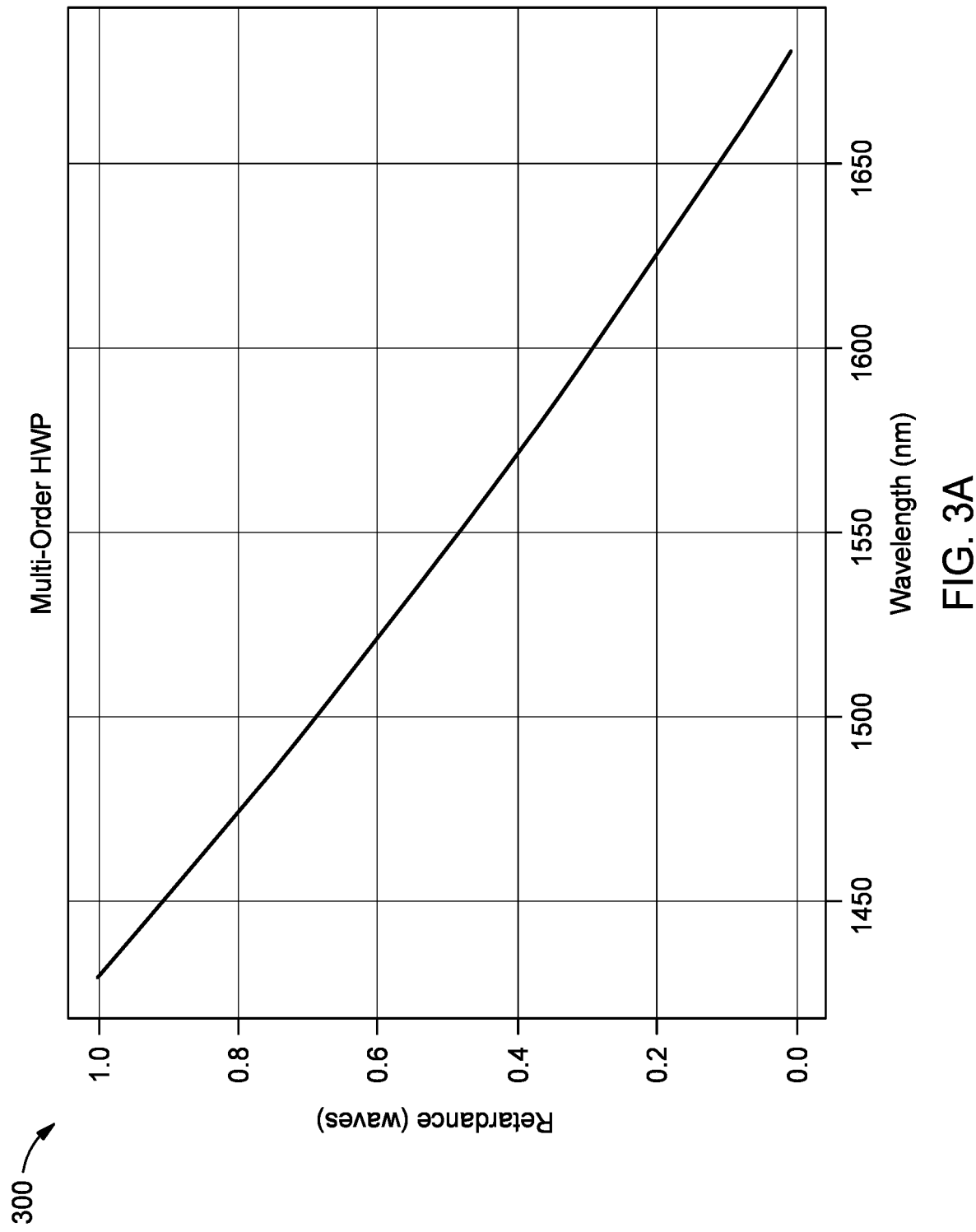
FIGS. 3A and 3B are charts illustrating properties of a half-wave plate, according to one embodiment.
Figure 3B:
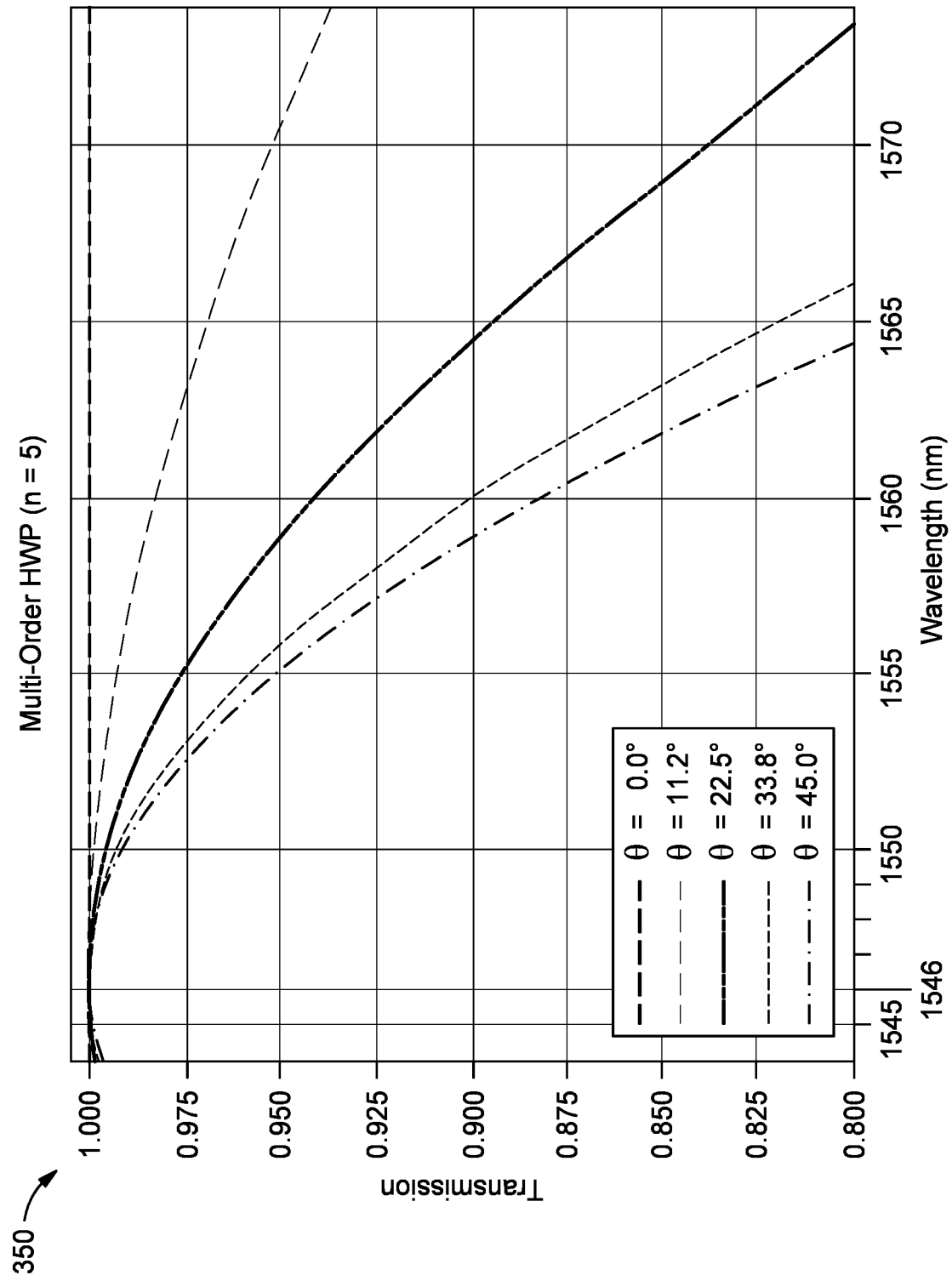

FIGS. 3A and 3B are charts illustrating properties of a half-wave plate, according to one embodiment. The chart 300 in FIG. 3A illustrates the retardance of a half-wave plate (HWP) at different frequencies or wavelengths. In this case, the HWP provides 0.5 retardance (i.e., half retardance) at a design wavelength of 1546 nm. As such, if the light at 1546 nm passes through the HWP twice, it will have the same polarization that it did originally (e.g., it experiences a full wave of retardance and thus zero polarization change). However, wavelengths less than or greater than 1546 nm experience retardances less than 0.5 or greater than 0.5 after a single pass, which is due to dispersion. Thus, when these wavelengths pass through the HWP twice, they do not have the same polarization as they had originally. As mentioned above, this fact can be used to attenuate or extinguish frequencies that are not at a center (or desired) frequency—e.g., 1546 nm in this example—by transmitting the laser signal through a polarizer (e.g., the polarizer 115 in FIG. 1) that is selected to attenuate signals that do not have the original polarization. The wavelength attenuation increases approximately quadratically with separation from the design wavelength. The combination of the HWP and the polarizer creates a spectral filter in the cavity.

FIG. 3A illustrates that a HWP can be selected to have a 0.5 retardance at a desired frequency but have different retardances at other frequencies, which results in a polarization rotation after passing through the HWP twice. Having different retardances at different wavelengths is a characteristic of birefringent elements, such as the HWP, a full-wave plate (FWP) and a birefringent crystal. Thus, the type of HWP selected (e.g., the type of material or other characteristic) will change depending on the desired frequency of the laser signal so that the HWP has a 0.5 retardance at a design wavelength that is shorter than the nominal laser wavelength. However, as discussed next, the retardance applied by the HWP to wavelengths other than the design wavelength can change according to its rotation.

The chart 350 in FIG. 3B illustrates the effects of rotating a HWP. Theta (Θ) represents the relative angle between the input light polarization and either the fast or slow axis of the HWP. Θ=0 is when the filter contrast created by the HWP and the polarizer is at minimum. At this rotation angle, the HWP and the filter have substantially no effect on the light since the HWP does not change the polarization of the laser signal.

Conversely, the filter contrast is maximum when the HWP is rotated at 45 degrees (Θ=45 degrees) with respect to the light polarization. That is, Θ=45 degrees results in the most attenuation of the frequencies or colors that are not at the design wavelength (i.e., 1546 nm). The center frequency has a full wave of retardance so that it is unaffected by the polarizer.

The other values of Θ in chart 350 indicate various degrees of filtering between the full attenuation at 45 degrees and no attenuation at 0 degrees. Thus, chart 350 illustrates how rotating a birefringent element (e.g., the HWP) can change the attenuation or filtering achieved by the combination of the HWP and a polarizer.

In one embodiment, the center wavelength of the HWP is shorter than the wavelength the laser will operate at in the absence of the HWP. For example, if the HWP is not in the cavity, the laser may lase at 1550 nm. So the designer may select the design wavelength of the HWP to be even shorter (e.g., 1540 nm or 1545 nm) rather than at 1546 nm as shown in FIG. 3B. Choosing a HWP design wavelength at a shorter wavelength counteracts the soliton self-frequency shift, which shifts the laser to longer wavelengths (e.g., decreases the frequency). By making the design wavelength of the HWP shorter than the nominal laser wavelength, the cavity-pulling effect of the HWP intervenes to make the laser cavity have greater losses at longer wavelengths.

FIG. 4 illustrates a ring cavity 400 with a HWP 410, according to one embodiment. The ring cavity 400 receives an optical signal (e.g., light) from a pump source such as the pump laser 150 in FIG. 1 at a pump port labeled as "Pump In". This port is coupled to a wavelength division multiplexer (WDM) 440. The light received from the pump at the WDM 440 is transmitted in the counterclockwise direction towards a gain fiber 435. As a non-limiting example, the optical signal provided by the pump may be a 980 nm or 1480 nm optical signal which causes the gain fiber 435 to fluoresce and generate a 1550 nm optical signal. Any of the pump optical signal (980 nm) that was not absorbed by the gain fiber 435, and any of the optical signal generated by the gain fiber 435 (1550 nm light) that travels in the counterclockwise direction is dispersed by a circulator 420, which is discussed in more detail blow. That is, the circulator 420 does not permit optical signals to traverse the ring cavity fiber laser 400 in the counterclockwise direction. However, the light generated by the gain fiber 435 that travels in the clockwise direction passes through the WDM 440 and enters the optical fiber 425 and the circulator 420.

In this embodiment, only the light propagating in the clockwise direction can pass through the circulator 420, however, it is equally feasible to configure the ring cavity 400 such that only the light traveling in the counterclockwise direction passes through the circulator 420. In any case, after traveling around the ring cavity 400, the WDM 440 permits at least a portion of the light to exit the cavity 100 at a laser output labeled "Laser Out".

In one embodiment, the optical fiber 425 is different from the gain fiber 435. For example, the optical fiber 425 may be an undoped or non-gain fiber while the gain fiber 435 can be a doped optical fiber. The gain fiber 435 is used to amplify the light traveling in the ring cavity 400. In one embodiment, the gain fiber 435 is fused or spliced to the optical fiber 425. That is, each end of the gain fiber 435 can be fused to respective optical fibers 425. As shown, one piece of optical fiber 425 optically couples the WDM 440 to the circulator 420 via an input port (Port 1), a second piece of optical fiber 425 optically couples the circulator 420 via an output port (Port 3) to a first end of the gain fiber 435, and a third piece of optical fiber 425 optically couples a second end of the gain fiber 435 to the WDM 440. However, this is just one example, and other implementations may use more or fewer pieces of optical fiber 425.

Another portion of the circulator 420 (Port 2) is coupled to a collimator 405 which receives the light that entered into the circulator 420 via Port 1. That is, the circulator 420 forwards the light it receives on Port 1 to Port 2. The collimator 405 can be coupled to the circulator 420 using a fiber (e.g., the same type as fiber 425). However, in other embodiments, the collimator 405 can be integrated into the circulator 420, rather than being connected by a fiber. The collimator 405 then outputs a collimated, free space laser signal. This free-space laser signal then passes through the HWP 410. As discussed in FIG. 3, the portion of the light at the design frequency (e.g., 1546 nm) receives a half-wave retardance, while the other frequencies receive different retardances depending on the frequency separation they are from the design frequency and the rotation of the HWP 410.

The laser signal is then reflected by a mirror 415 so the signal again passes through the HWP 410. Again, the light at the design frequency (e.g., 1546 nm) receives another half-wave retardance, so that this portion of the laser signal experiences a full-wave retardance. As such, the polarization of the light at the design frequency is that same as when the light was output by the collimator 405. However, the portions of the laser signal not at the design frequency will have a different polarization since they do not experience a full-wave of retardance. That is, some wavelengths will experience less than a full-wave of retardance while other wavelengths will experience more than a full-wave of retardance. As such, their polarizations are different relative to when they exited the collimator 405.

In this embodiment, it is assumed that the collimator 405 includes a built in polarizer. Thus, when exiting the collimator 405, the wavelength of the laser signal has the same polarization as that defined by the polarizer. However, due to passing through the HWP 410, only the portion of the laser signal at the design frequency of the HWP 410 has the same polarization while the other frequencies in the laser signal have different polarizations. As such, when the laser signal again passes through the collimator 405 and its built in polarizer, the frequencies with different polarizations are attenuated or extinguished by the polarizer. This spectrally-dependent loss counters the soliton self-frequency shift in the laser signal, which results in a laser with a narrower linewidth.

The circulator 420 permits unidirectional lasing where light can pass through the circulator 420 only if it enters from Port 1 and exits the circulator 420 through Port 3. Thus, any light received at Port 3 is scattered or attenuated so light does not propagate in the counterclockwise direction around the ring cavity 400. Further, when the light is reflected from the mirror 415, the circulator 420 prevents that light from exiting through Port 1. Unidirectional lasing makes the ring laser less susceptible to vibrations and acoustics.

In one embodiment, the mirror 415 is moveable to adjust the length of the ring cavity 400. That is, changing the distance between the mirror 415 and the collimator 405 changes the distance the light travels as it propagates in the ring cavity 400. For example, the mirror 415 may be disposed on an actuator that moves the mirror 415 in a direction that is parallel with the direction of the light propagation. Using a ring cavity 400 with a movable mirror 415 avoids spurious intra-cavity back reflections, but is not a requirement. Additionally or alternatively, the fiber 425 could be stretched in order to change the length of the cavity 400.

FIG. 5 illustrates a linear cavity 500 with a HWP 505, according to one embodiment. The linear cavity 500 receives an optical signal (e.g., light) from a pump source such as the pump laser 150 in FIG. 1 at a pump port labeled as "Pump In". This port is coupled to a WDM 540. The light received from the pump at the WDM 540 is transmitted towards a gain fiber 535. As a non-limiting example, the optical signal provided by the pump may be a 980 nm or 1480 nm optical signal which causes the gain fiber 535 to fluoresce and generate a 1550 nm optical signal.

In one embodiment, the optical fiber 525 is different from the gain fiber 535. For example, the optical fiber 525 may be an undoped or non-gain fiber while the gain fiber 535 can be a doped optical fiber. The gain fiber 535 is used to amplify the light traveling in the linear cavity 500. As shown in this example, the gain fiber 535 is fused or spliced to the optical fiber 525 at respective ends.

The collimator 515 receives the light from the gain fiber 535 and outputs a free space, collimated laser signal. This free-space laser signal then passes through a HWP 505. As discussed in FIG. 3, the portion of the light at the design wavelength (e.g., 1546 nm) receives a half-wave retardance, while the other frequencies receive different retardances depending on the magnitude of their separation from the design frequency and the rotation of the HWP 505.

The laser signal is then reflected by a mirror 510 so the signal again passes through the HWP 505. Again, the light at the design wavelength (e.g., 1546 nm) receives another half-wave retardance, so that this portion of the laser signal experiences a full-wave retardance. As such, the polarization of the light at the design wavelength is the same as when the light was output by the collimator 515. However, the portions of the laser signal not at the design wavelength will have a different polarization since they do not experience a full-wave of retardance due to dispersion. That is, some wavelengths will experience less than a full-wave of retardance while other wavelengths will experience more than a full-wave of retardance. As such, their polarizations are different relative to when they exited the collimator 515.

In this embodiment, it is assumed that the collimator 515 includes a built-in polarizer. Thus, when exiting the collimator 515, the wavelengths of the laser signal have the same polarization. However, due to passing through the HWP 505, only the portion of the laser signal at the design wavelength has the same polarization while the other frequencies in the laser signal have different polarizations. As such, when the laser signal again passes through the collimator 515 and its built in polarizer, the frequencies with different polarizations are attenuated or extinguished by the polarizer. Like the ring cavity in FIG. 4, this counteracts the soliton self-frequency shift in the laser signal, which results in a narrower linewidth.

The free-space laser signal reflected by the mirror 510 passes through the HWP 505 again and is reintroduced into the optical fiber 525. The WDM 540 then forwards a portion of this light on an output port (labeled "Laser Out"). That is, the WDM 540 ensures that the light received at the port coupled to the gain fiber 535 is transmitted on its output port rather than the input port for the pump.

Figure 6:
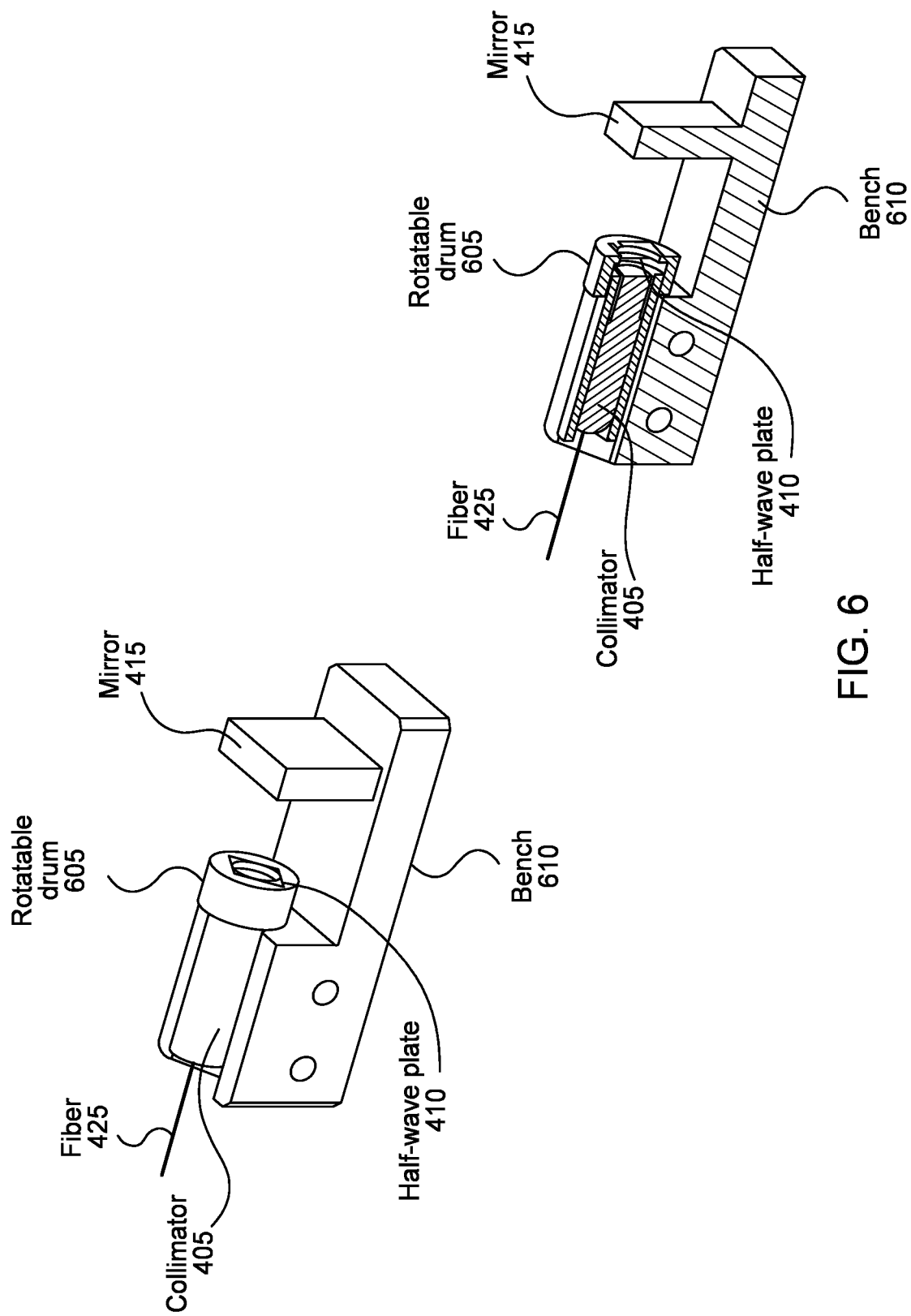
FIG. 6 illustrates a plan view of a portion of FIGS. 4 and 5, according to one embodiment.

FIG. 6 illustrates plan views of a portion of FIGS. 4 and 5, according to one embodiment. That is, FIG. 6 illustrates the collimator 405, HWP 410, and mirror 415 in FIG. 4, but can also show an arrangement for the collimator 515, HWP 505, and mirror 510 in FIG. 5.

FIG. 6 illustrates an optical fiber 425 which can be coupled to the circulator 420 in FIG. 4 or to the gain fiber 535 in FIG. 5. The light received on the fiber 425 is then received and collimated by the collimator 405. As mentioned above, the collimator 405 can include a built in polarizer.

Figure 8A:
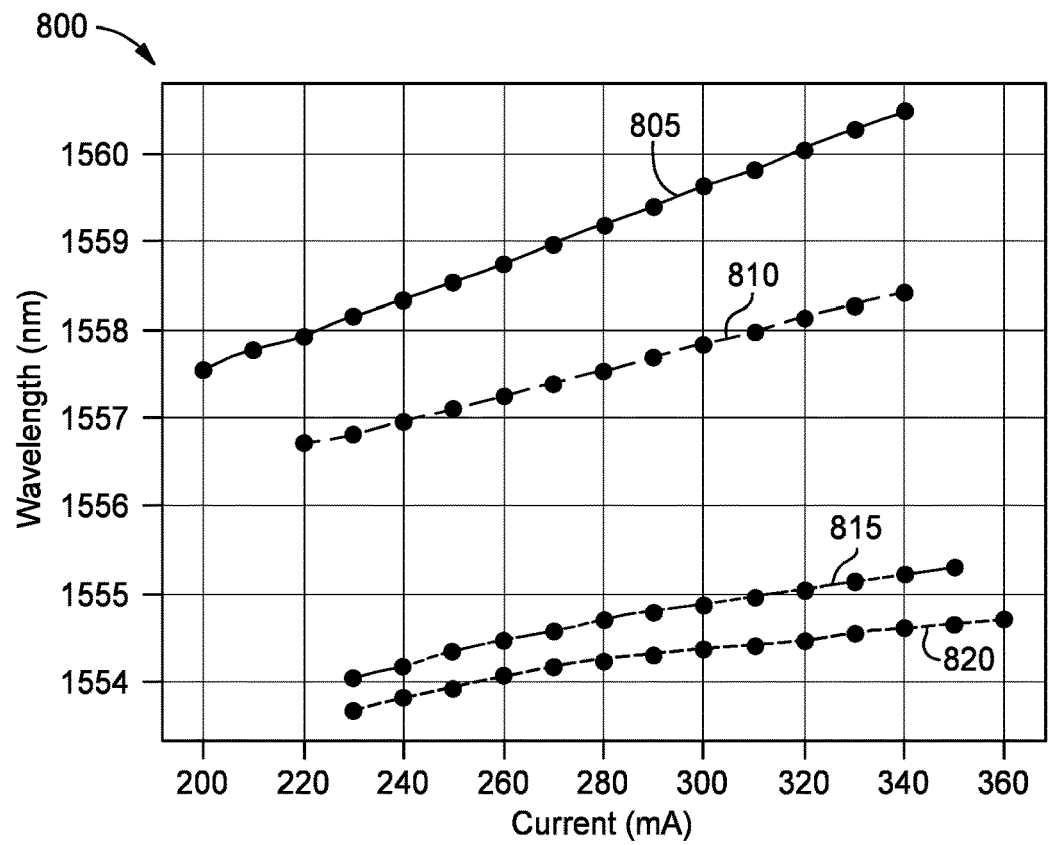
FIGS. 8A-8C illustrate charts associated with rotating a half-wave plate, according to one embodiment.

The collimated light passes through a rotatable drum 605 (e.g., a wheel) which includes the HWP 410. The drum 605 (e.g., an example of a rotatable element) permits a user to change the rotation of the HWP 410 to achieve the different transmission plots illustrated in chart 350. For example, during a configuration stage, the user may rotate the drum 605 until reaching a desired linewidth of the laser signal (e.g., a maximum attenuation of the phase noise). However, as shown in FIG. 8A below, rotating the HWP 410 may also change the wavelength. If the user wants a particular wavelength, the user may set the rotatable drum 605 so the HWP 410 provides a particular output wavelength for the laser rather than generate the narrowest linewidth.

However, the rotatable drum 605 is optional. In other embodiments, a manufacturer may fix the rotation of the HWP 410. For example, the manufacturer may offer to sell different variations of the system illustrated in FIG. 6 where the HWP 410 has been rotated (and set) to different angles (e.g., 15 degrees, 33 degrees, 45 degrees, etc.).

As discussed above, the collimated light passes through the HWP 410, reflects off the mirror 415, and then passes through the HWP 410 a second time. The collimator 405 then reintroduces the laser signal back into the fiber 425.

FIG. 6 includes a bench 610 that helps to align and maintain a fixed spatial relationship between the collimator 405, the HWP 410, and the mirror 415. For example, placing these components on alignment features on the bench 610 may then passively align the components. For example, the bench 610 may include a V-groove in which the collimator 405 and the rotatable drum 605 are disposed in order to passively align these components with the mirror 415.

FIG. 6 also includes a cross-sectional view of the collimator 405, rotatable drum 605, HWP 410, mirror 415, and bench 610. This cross sectional view illustrates that the collimator 405 (with its built in polarizer) can output a free space laser signal which passes through the HWP 410 and to the mirror 415 where it is then reflected.

In one embodiment, the bench 610 has a length that is less than or equal to an inch (e.g., less than or equal to 2.5 cm). In one embodiment, the bench 610 has a width that is less than or equal to half an inch (e.g., less than or equal to 1.25 cm).

Figure 7:
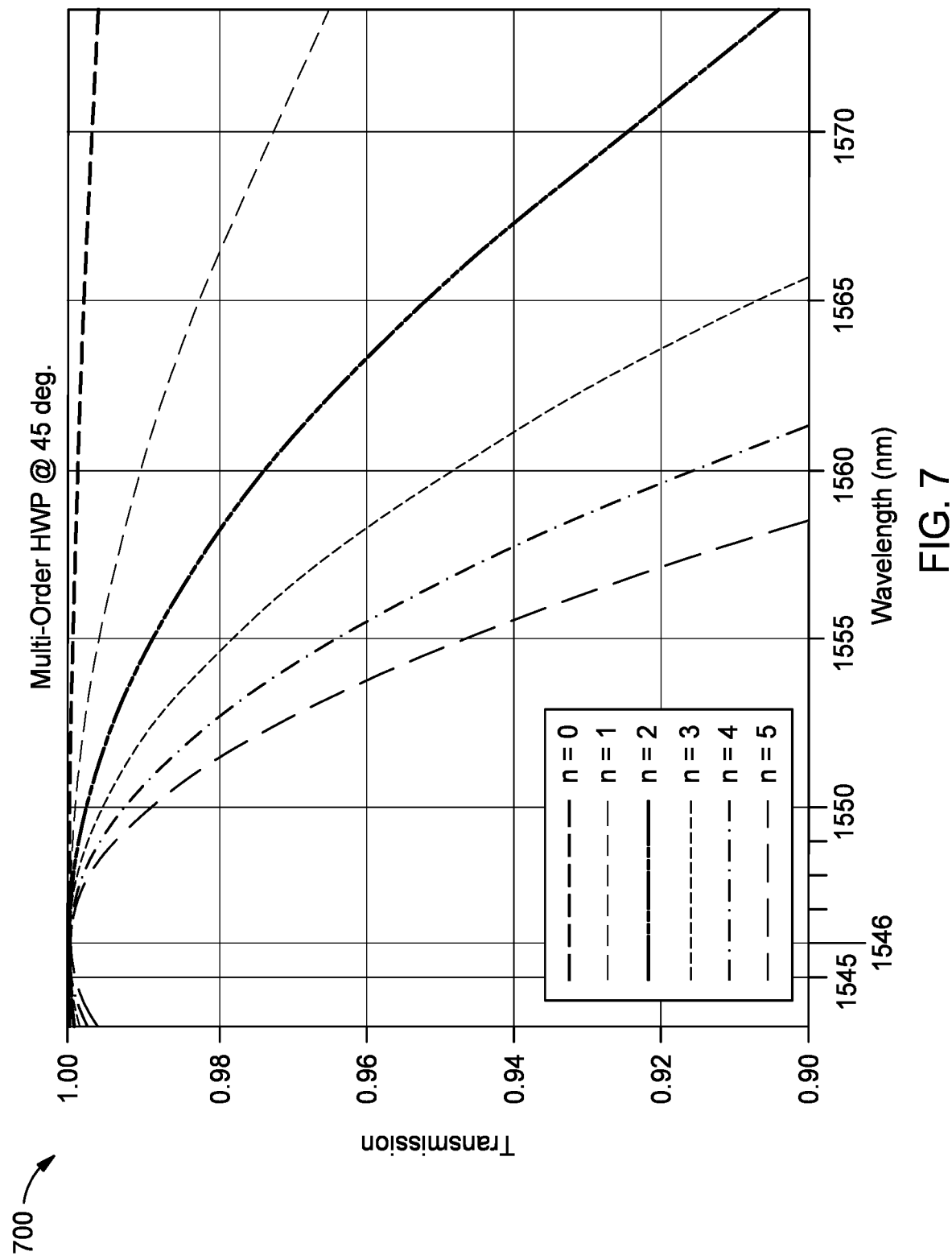
FIG. 7 illustrates properties of half-wave plates with different thicknesses, according to one embodiment.

FIG. 7 illustrates the cavity effects for a HWP with different orders, according to one embodiment. A HWP can be formed using a very thin material (e.g., less than 1 mm). However, fabricating a HWP with a small thickness is difficult to manufacture and to handle. As such, manufactures of HWPs often increase the thickness by including an integer number of full-wave plate thicknesses. That is, a HWP can be formed using a number n of full-wave plates plus a half-wave plate thickness. As an example, assume that for a particular material, it requires 100 microns of the material to make a HWP and 200 microns of material to make a full-wave plate (FWP). A HWP can be made by making the material 300 microns thick since the first 200 microns of the material provides a full-wave of retardance (which does not change the polarization of the original laser signal at the center or desired frequency) and the last 100 microns of the material provides a half-wave of retardance. Thus, at the design frequency, a 100 micron thick HWP functions the same as a 300 micron thick HWP. This can be expanded by using an integer number of FWP thicknesses. For example, a HWP can be formed with a 500 micron thick material (e.g., 2*FWP thickness+HWP thickness), or 700 micron thick material (e.g., 3*FWP thickness+HWP thickness). These HWPs have different thickness but each provides a half-wave of retardance at the design wavelength.

However, as discussed above, dispersion causes the wavelengths or frequencies in the laser signal not at the design wavelength to receive other than a half-wave of retardance. Chart 700 illustrates that the thicker the HWP (e.g., the greater the number n of FWPs), the more this dispersion affect changes the spectral filtering of the wavelengths that are not at the design frequency (e.g., 1546 nm in this example).

Thus, chart 700 illustrates that the thickness of the HWP (e.g., n*FWP thickness) is another tunable parameter than can be used to attenuate or extinguish the wavelengths in the laser signal that are not at the design wavelength. A larger value of n (i.e., the thicker the HWP) provides a stronger attenuation for wavelengths not at the design wavelength.

Figure 8B:
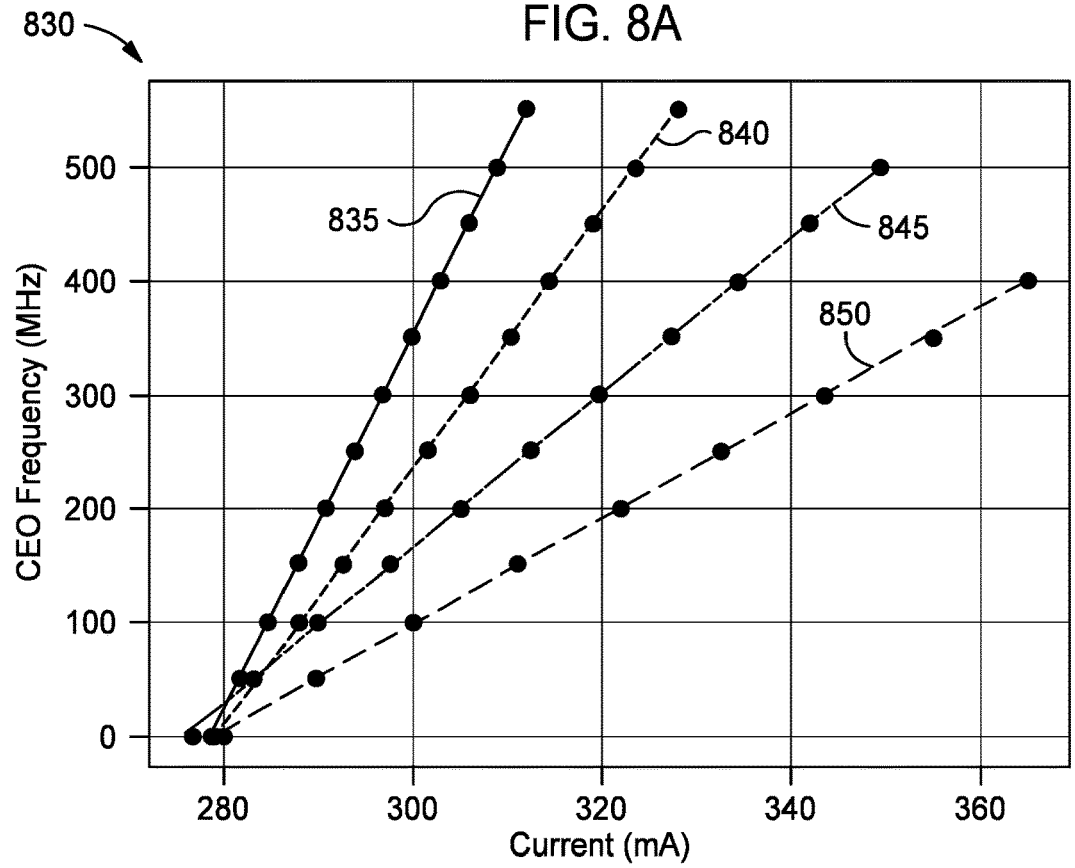
Figure 8C:
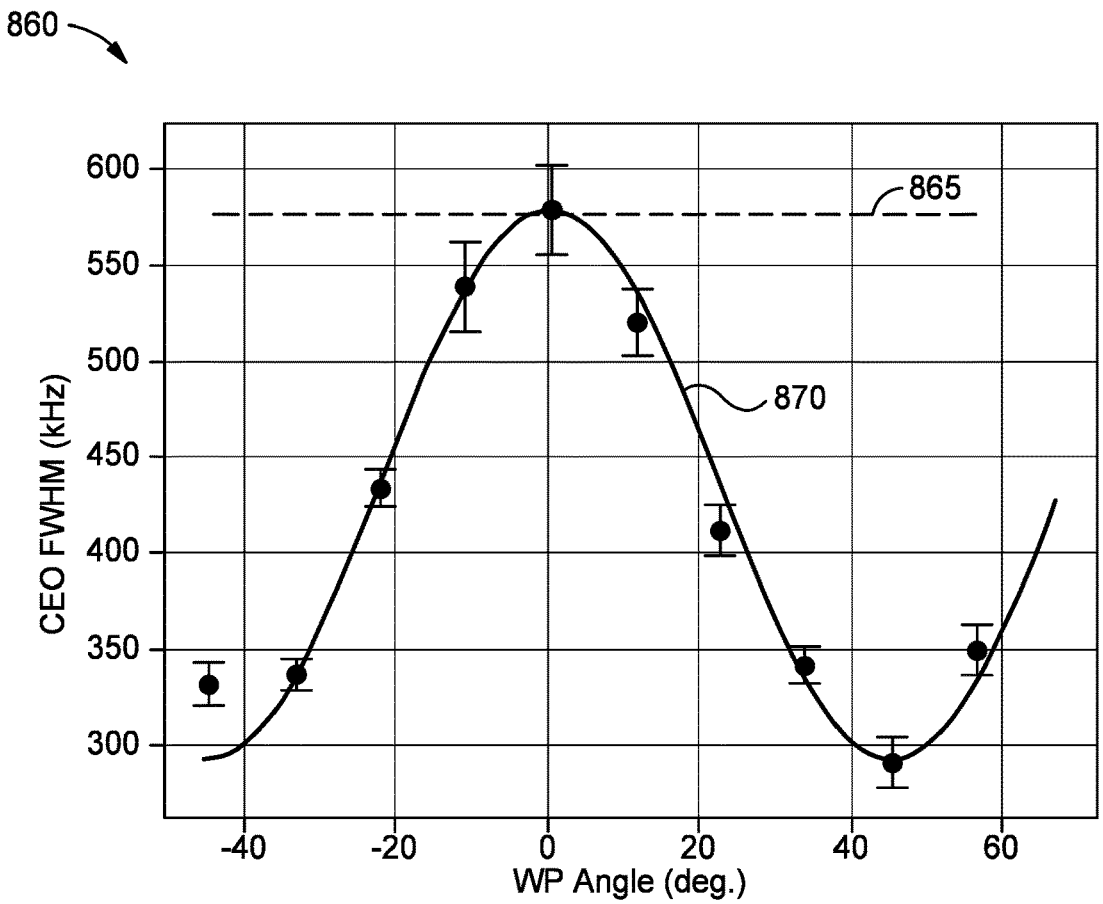

FIGS. 8A-8C illustrates charts associated with rotating a HWP, according to one embodiment. FIG. 8A includes chart 800 which illustrates the wavelength of the laser signal when the current is changed (e.g., the amount of power delivered to the laser). Plot 805 illustrates a laser cavity without a birefringent element (e.g., a HWP, FWP, or birefringent crystal). In that case, the more current provided the laser, the more the wavelength shifts to longer wavelengths due to the soliton self-frequency shift. The slope of the plot 805 is proportional to the amount of CEO phase noise being introduced into the laser signal from pump laser RIN.

The plots 810, 815, and 820 correspond to the same laser, but this time there is a wave plate (or other birefringent element) and polarizer in the cavity. In plot 810, the wave plate has an 11.25 degree rotation. In plot 815, the wave plate has a 33.75 degree rotation. In plot 820, the wave plate has a 56.25 degree rotation.

Adding the wave plate shifts the laser to shorter wavelengths due to its design wavelength being shorter than the laser wavelengths illustrated in plot 805. For example, the plot 810 indicates the minimum wavelength is 1556.5 nm with a current of 220 mA, but the minimum wavelength of plot 805 is 1557.5 nm with a current of 200 mA. Thus, as the wave plate is rotated, the spectral filtering provided by the wave plate increases, which pulls the laser wavelength to shorter values (closer to the design wavelength). In addition, the spectral shift as a function of pump current is smaller when the waveplate is introduced and is smallest for plot 820.

Chart 830 in FIG. 8B illustrates the relationship between the CEO frequency and the current. The plot 835 corresponds to a laser that does not have a birefringent element, while plot 840 illustrates a laser with a wave plate rotated 11.25 degrees, plot 845 illustrates a laser with a wave plate rotated 33.75 degrees, and plot 850 illustrates a laser with a wave plate rotated 56.25 degrees.

The plots in chart 830 illustrate that the rate at which the CEO frequency varies with a change in the pump laser current decreases as the wave plate is turned to 45 deg. This rate multiplies the RIN of the pump laser to describe the quantity of CEO phase noise. Thus, for a given RIN, a smaller slope means less CEO phase noise.

Chart 860 in FIG. 8C illustrates the relationship between the CEO linewidth, which is described by its full width at half maximum (FWHM), and the rotation of the wave plate. The plot 865 illustrates the CEO FWHM (or the CEO linewidth) when there is no wave plate. The data points indicate the direct measurement of the CEO linewidth as the wave plate is rotated as indicated on the X axis. The plot 870 is an empirical fit to the data points in the chart 860. As shown, the linewidth narrows as the wave plate orientation is rotated from 0 degrees to 45 degrees.

FIG. 9A illustrates a ring cavity 900 with a FWP, according to one embodiment. The ring cavity 900 receives an optical signal (e.g., light) from a pump source such as the pump laser 150 in FIG. 1 at a pump port labeled as "Pump In". This port is coupled to a WDM 940. The light received from the pump at the WDM 940 is transmitted in the counterclockwise direction towards a gain fiber 935. As a non-limiting example, the optical signal provided by the pump may be a 980 nm or 1480 nm optical signal which causes the gain fiber 935 to fluoresce and generate a 1550 nm optical signal. Any of the pump optical signal (980 nm) that was not absorbed by the gain fiber 935, and any of the optical signal generated by the gain fiber 935 (1550 nm light) that travels in the counterclockwise direction is blocked by an isolator 950 which permits the 1550 nm light to only propagate clockwise in the ring. The light generated by the gain fiber 935 that travels in the clockwise direction passes through the WDM 940 and enters the collimator 915B.

In one embodiment, the collimator 915B does not have a polarizer, although it could. The collimator 915B collimates the light which then passes through the FWP 910, which adds a full-wave of retardance to the light at the design frequency of the wave plate. Thus, the light at the design wavelength has the same polarization after passing through the FWP 910. However, due to dispersion, frequencies around the design frequency experience less, or more, of a full wave of retardance. As such, their polarizations change.

The light then passes through the collimator 915A, which includes a built in polarizer. The frequencies with different polarizations are attenuated or extinguished by the polarizer. This spectral cavity pulling effect provided by the FWP counters the soliton self-frequency shift in the laser signal and yields a laser with a narrower linewidth. In any case, after traveling around the ring cavity 900, the WDM 940 permits at least a portion of the light to exit the cavity 900 at a laser output labeled "Laser Out".

FIG. 9B illustrates a ring cavity 960 with a FWP 910, according to one embodiment. The ring cavity 960 includes optical components from the ring cavity 400 in FIG. 4 and the ring cavity 900 in FIG. 9A. That is, the full-wave plate 910 ring structure in FIG. 9A can be combined with the circulator 420, collimator 405, and mirror 415 in FIG. 4. This adds the advantage of having, for example, a moveable mirror 415 which can avoid spurious intra-cavity back reflections.

Figure 10:
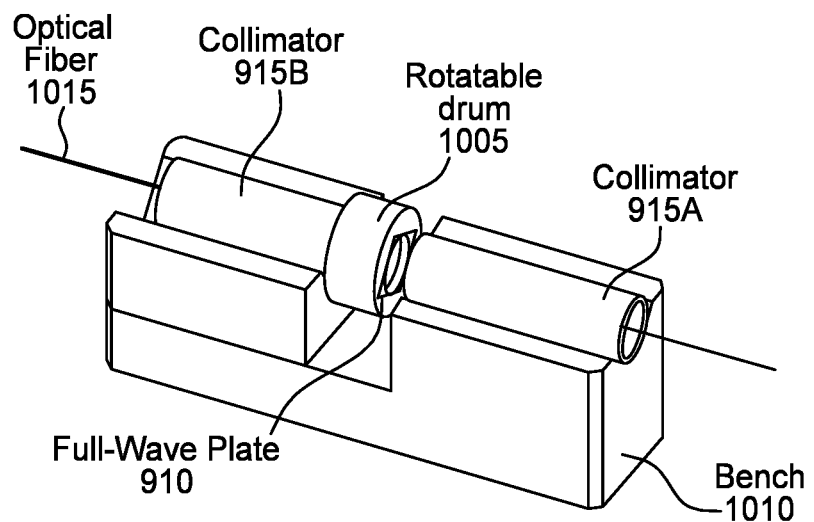
FIG. 10 illustrates a portion of the ring cavity in FIGS. 9A and 9B, according to one embodiment.

FIG. 10 illustrates a portion of the ring cavity in FIG. 9, according to one embodiment. FIG. 10 illustrates an optical fiber 1015 which can be coupled to the collimator 915B to receive the light traveling in the clockwise direction according to the ring cavity 900 in FIG. 9.

The collimated light passes through a rotatable drum 1005 which includes the FWP 910. The drum 1005 (e.g., an example of a rotatable element) permits a user to change the rotation of the FWP 910 to achieve the different attenuation plots illustrated in chart 350. For example, during a configuration stage, the user may rotate the drum 1005 until reaching a desired linewidth of the laser signal. However, the rotatable drum 1005 is optional. In other embodiments, a manufacturer may fix the rotation of the FWP 910. For example, the manufacturer may offer to sell different variations of the system illustrated in FIG. 10 where the FWP 910 has been rotated (and set) to different angles (e.g., 15 degrees, 33 degrees, 45 degrees, etc.).

As discussed above, the collimated light passes through the FWP 910, is filtered by the polarizer in collimator 915A, and is reintroduced back into an optical fiber.

FIG. 10 includes a bench 1010 that helps to align and maintain a fixed spatial relationship between the collimators 915A and 915B. For example, placing these components on alignment features on the bench 1010 may passively align the components. For example, the bench 1010 may include V-grooves in which the collimators 915 are disposed in order to passively align these components with each other.

Instead of using a waveplate as discussed in many of the embodiments above, in one embodiment, the birefringent element can be a dielectric metasurface could be used to rotate the polarization. Dielectric metasurfaces include periodic sub-wavelength structures, e.g. pillars, that provide fine control of polarization, amplitude, and phase degrees of freedom for incident light owing to the nanometer-scale lithographic definition for each structure. Moreover, a metasurface can be fabricated as a flat optic that can be optically bonded to other substrates, e.g. the collimator in the laser bench. Recently, tunable dielectric metasurfaces have been experimentally demonstrated where the polarization rotation can be voltage controlled.

Figure 11:
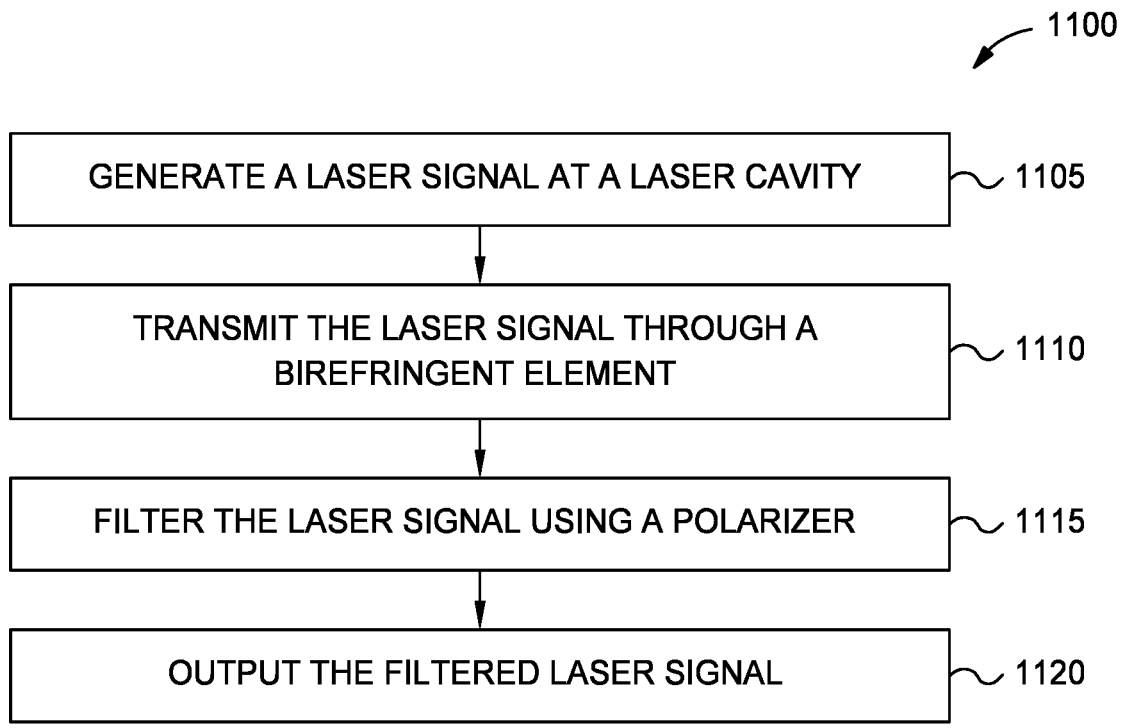
FIG. 11 is a flowchart for operating a laser cavity, according to one embodiment.

FIG. 11 is a flowchart of a method 1100 for operating a laser cavity. At block 1105, the laser cavity generates a laser signal. For example, the laser signal may be generated in a gain region using a pump laser. In one embodiment, the laser signal is a mode locked laser. In a further embodiment, the laser signal is a PM mode locked laser. In one embodiment, the laser signal is a frequency comb.

At block 1110, the laser cavity transmits the laser signal through a birefringent element in the laser cavity. The birefringent element can be a half-wave plate, a full-wave plate, a birefringent crystal, and the like. As discussed in more detail above, due to dispersion, the laser polarization after the birefringent element depends upon wavelength.

At block 1115, a polarizer filters the laser signal after the laser signal has passed through the birefringent element. In one embodiment, the polarizer is designed to pass only one particular polarization direction. The light at the design wavelength of the birefringent element is passed by the polarizer without attenuation. The wavelengths not at the design wavelength will have different polarizations due to the birefringent element, and thus, are attenuated by the polarizer. In one embodiment the birefringent element and the polarizer form a spectral filter that control a soliton self-frequency shift corresponding to the laser signal. For example, this spectral filter can reduce the soliton self-frequency shift induced broadening of the linewidth of the laser signal (e.g., a frequency comb).

At block 1120, the laser cavity outputs the filtered laser signal.

Figure 12:
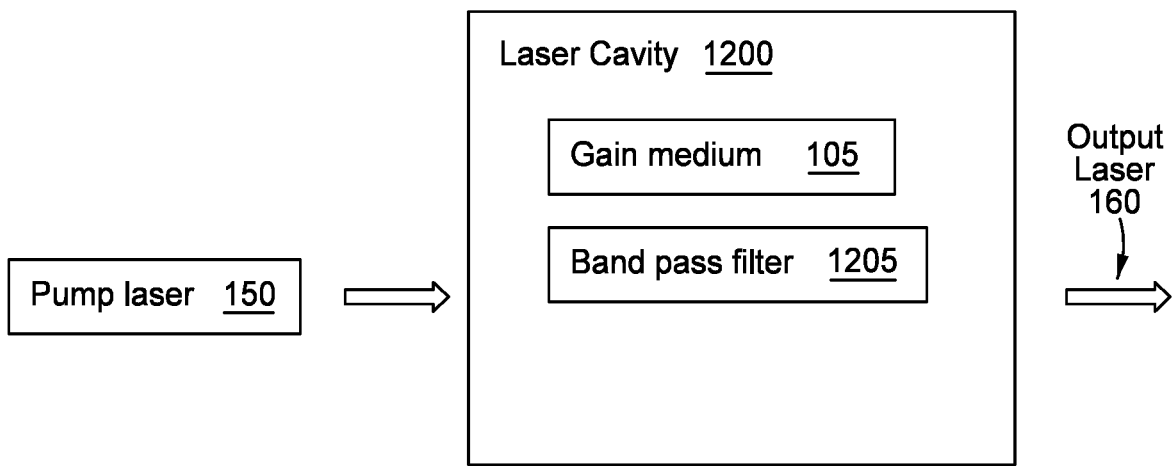
FIG. 12 illustrates a laser system, according to one embodiment.

FIG. 12 illustrates a laser system, according to one embodiment. Like the laser system in FIG. 1, FIG. 12 includes the pump laser 150 which is coupled to the laser cavity 1200. The pump laser 150 can be a fiber laser or a free space laser. Further, the laser system in FIG. 12 can generate a frequency comb.

The laser cavity 1200 includes a gain medium 105 and a band-pass filter 1205. In general, the gain medium 105 (e.g., a gain fiber) amplifies the input optical signal. However, in one embodiment, the laser system in FIG. 12 may not have a birefringent element and instead relies on the band-pass filter 1205 to mitigate the soliton self-frequency shift and thereby narrow the linewidth of the laser signal. In one embodiment, the filter 1205 decreases the CEO phase noise for a frequency comb that is induced by pump laser RIN.

In one embodiment, the band-pass filter 1205 permits light at a desired, center frequency of the laser signal (e.g., 1550 nm) to pass through, but attenuates or filters light that is not at the center frequency, similar to how the polarizer and birefringent element functions in the previous embodiments. However, when using a band-pass filter 1205, it often attenuates the light at the center frequency (e.g., introduce a 10% loss) while using a birefringent element does not. Moreover, a band-pass filter 1205 cannot be tuned (e.g., spun or rotated) like a wave plate in order to changes its degree of attenuation. Thus, a band-pass filter cannot be tuned like a wave plate mounted on the rotatable drum as discussed above. But a band-pass filter may result in a more compact solution to mitigate the soliton self-frequency shift than using a tunable birefringent element.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A laser cavity, comprising:
    an input port configured to receive a pump signal to generate a frequency comb;
    an output port configured to transmit the frequency comb;
    a birefringent element configured to receive the frequency comb; and
    a polarizer configured to filter the frequency comb after the frequency comb has passed through the birefringent element, wherein the birefringent element and the polarizer are configured to reduce relative intensity noise (RIN)-induced phase noise for a beatnote in the frequency comb.

2. The laser cavity of claim 1 wherein filtering the frequency comb using the polarizer reduces a soliton self-frequency shift induced broadening of a linewidth of the frequency comb.

3. The laser cavity of claim 1, further comprising a collimator configured to collimate the frequency comb and transmit the frequency comb in free space before passing through the birefringent element.

4. The laser cavity of claim 3, further comprising:
    a mirror configured to reflect the frequency comb back through the birefringent element and back into the collimator, wherein the birefringent element comprises a half-wave plate.

5. The laser cavity of claim 4, wherein the frequency comb passes through the polarizer after passing through the half-wave plate twice.

6. The laser cavity of claim 4, wherein the collimator, half-wave plate, and mirror are disposed on the same bench.

7. The laser cavity of claim 5, wherein the laser cavity is a ring cavity, further comprising:
    a circulator configured to permit the frequency comb to transmit in only one direction in the ring cavity.

8. The laser cavity of claim 5, wherein the laser cavity is a linear cavity.

9. The laser cavity of claim 3, wherein the laser cavity is a ring cavity, further comprising:
    a second collimator, wherein the birefringent element comprises a full-wave plate disposed between the collimator and the second collimator.

10. The laser cavity of claim 9, wherein the collimator, the full-wave plate, and the second collimator are disposed on a same bench.

11. The laser cavity of claim 1, wherein the birefringent element is at least one of a half-wave plate, full-wave plate, birefringent crystal, or a metasurface.

12. The laser cavity of claim 1, wherein the birefringent element is mounted to a rotatable drum, wherein rotating the drum changes an amount of spectral filtering the birefringent element introduces on different frequencies of light in the frequency comb that are not at a center frequency of the frequency comb.

13. A method, comprising:
    receiving, at an input port, a pump signal to generate a frequency comb;
    transmitting the frequency comb through a birefringent element;
    filtering the frequency comb using a polarizer, after the frequency comb has passed through the birefringent element, wherein filtering the frequency comb reduces relative intensity noise (RIN)-induced phase noise for a beatnote in the frequency comb; and
    outputting the filtered frequency comb.

14. The method of claim 13, wherein filtering the frequency comb using the polarizer reduces a soliton self-frequency shift induced broadening of a linewidth of the frequency comb.

15. The method of claim 13, wherein the birefringent element comprises a half-wave plate, wherein the method further comprises:
    reflecting the frequency comb after passing through the half-wave plate such that the frequency comb passes through the half-wave plate twice.

16. The method of claim 13, further comprising:
    rotating the birefringent element to change an amount of polarization change the birefringent element introduces on different frequencies of light in the frequency comb that are not at a design frequency of the birefringent element.

17. The laser cavity of claim 1, wherein the RIN-induced phase noise originated from a pump laser.

18. The laser cavity of claim 1, wherein the beatnote is a carrier envelope offset (CEO) frequency ($f_{CEO}$) beatnote of the frequency comb.

* * * * *